4 Sheets--Sheet 1.

C. CHAMBERS, Jr.

Paper-Folding Machines.

No. 5,533. Reissued August 12, 1873.

Attest,
F. W. Howard
W. P. Dee

Inventor,
Cyrus Chambers, Jr.
By his Attorney
Chas. T. Ransbury

THE NORRIS PETERS CO., PHOTO-LITHO., WASHINGTON, D. C.

4 Sheets--Sheet 2.

C. CHAMBERS, Jr.

Paper-Folding Machines.

No. 5,533. Reissued August 12, 1873.

Attest:
H. W. Howard
N. P. Rice

Inventor:
Cyrus Chambers Jr.
By his Attorney
Chas. F. Stansbury

THE NORRIS PETERS CO., PHOTO-LITHO., WASHINGTON, D. C.

4 Sheets--Sheet 3.
C. CHAMBERS, Jr.
Paper-Folding Machines.
No. 5,533. Reissued August 12, 1873.
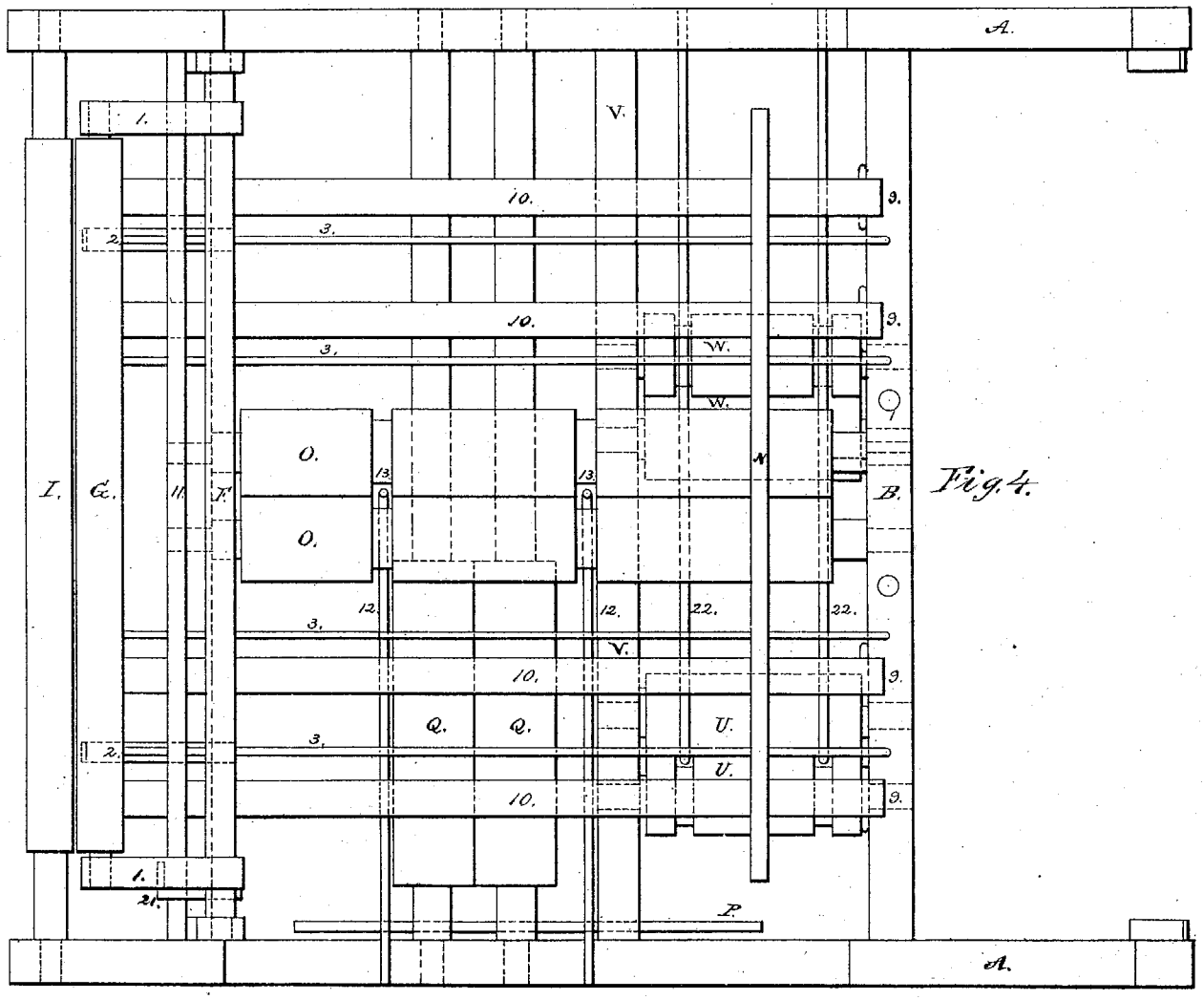
Attest,
F. W. Howard
M. P. Deen
Inventor:
Cyrus Chambers, Jr.
By his Attorney
Chas. F. Jansbury
THE AUBRY PETTS CO., PHOTO-LITHO., WASHINGTON, D.C.

C. CHAMBERS, Jr.
Paper-Folding Machines.
No. 5,533. Reissued August 12, 1873.
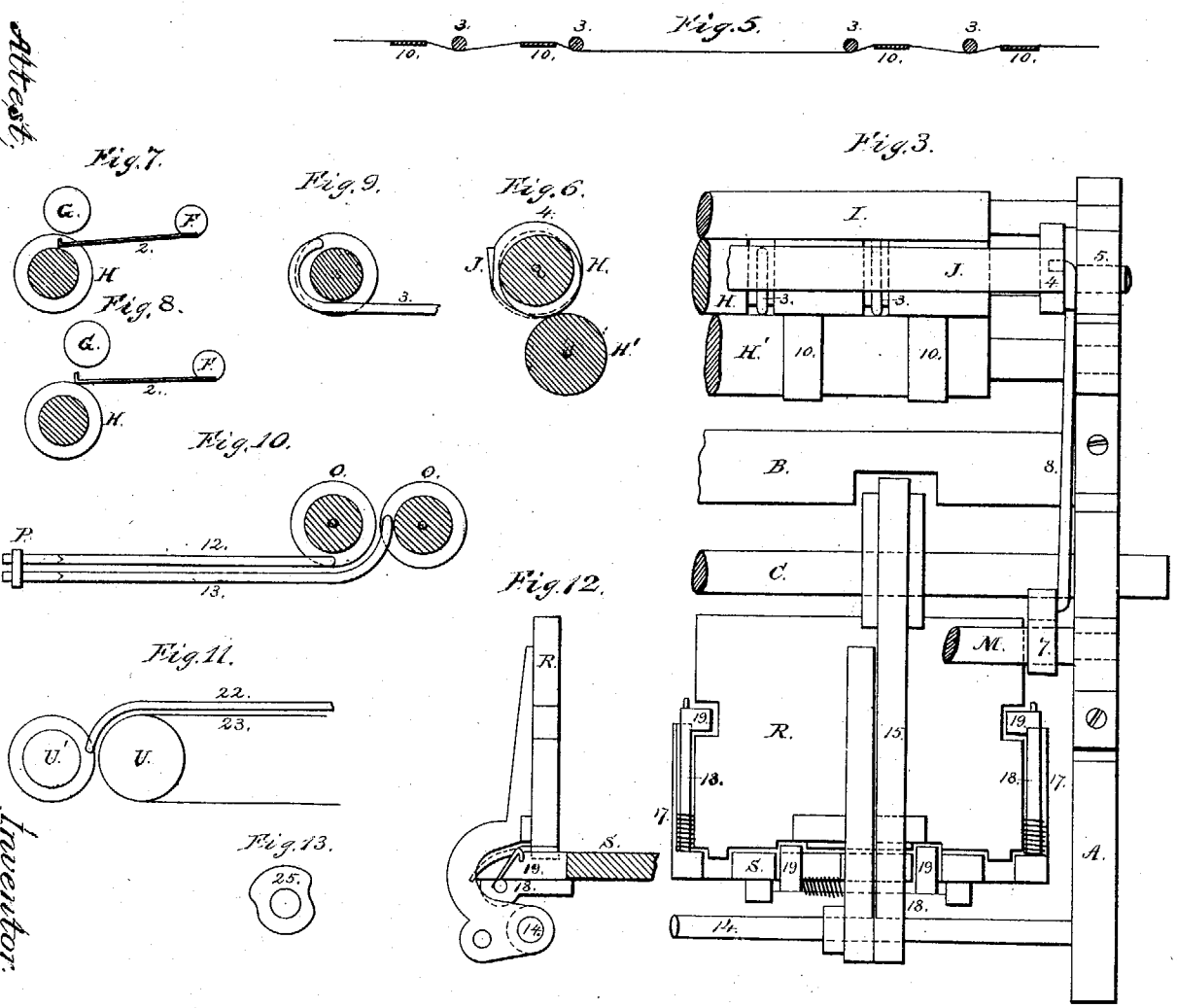
Attest,
F. W. Howard
W. P. Preu
Inventor,
Cyrus Chambers, Jr.
By his Attorney
Chas. F. Sansbury
THE NORRIS PETERS CO. PHOTO-LITHO., WASHINGTON, D. C.

UNITED STATES PATENT OFFICE

CYRUS CHAMBERS, JR., OF PHILADELPHIA, PENNSYLVANIA.

IMPROVEMENT IN PAPER-FOLDING MACHINES.

Specification forming part of Letters Patent No. 26,090, dated November 15, 1859; reissue No. 5,533, dated August 12, 1873; application filed June 30, 1873.

*To all whom it may concern:*

Be it known that I, CYRUS CHAMBERS, Jr., of the city of Philadelphia, in the State of Pennsylvania, have invented certain new and useful Improvements in Machinery for Folding Paper; and I do hereby declare the following to be a full and correct description of the same, reference being had to the accompanying drawings, in which—

Figure 1:
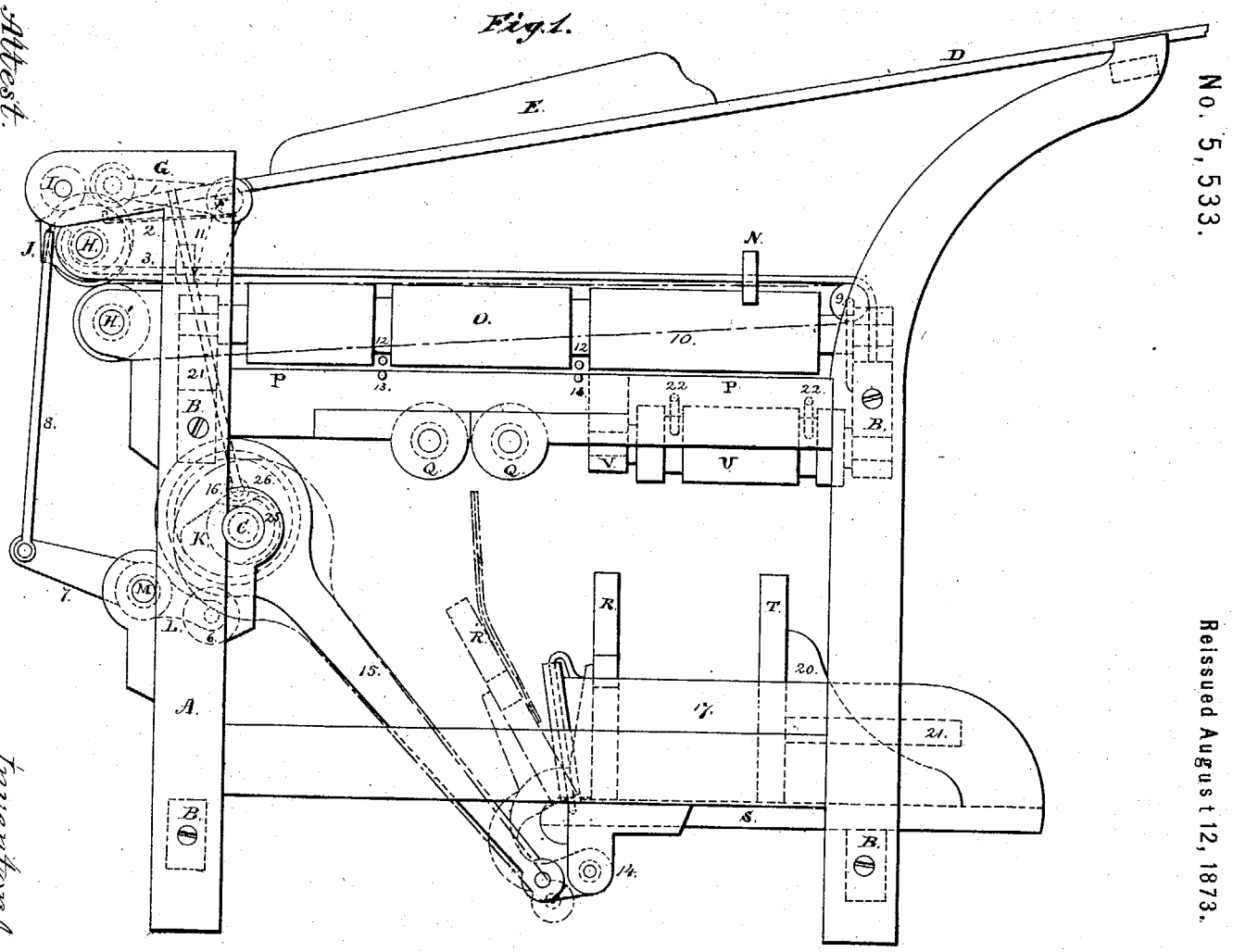
Figure 2:
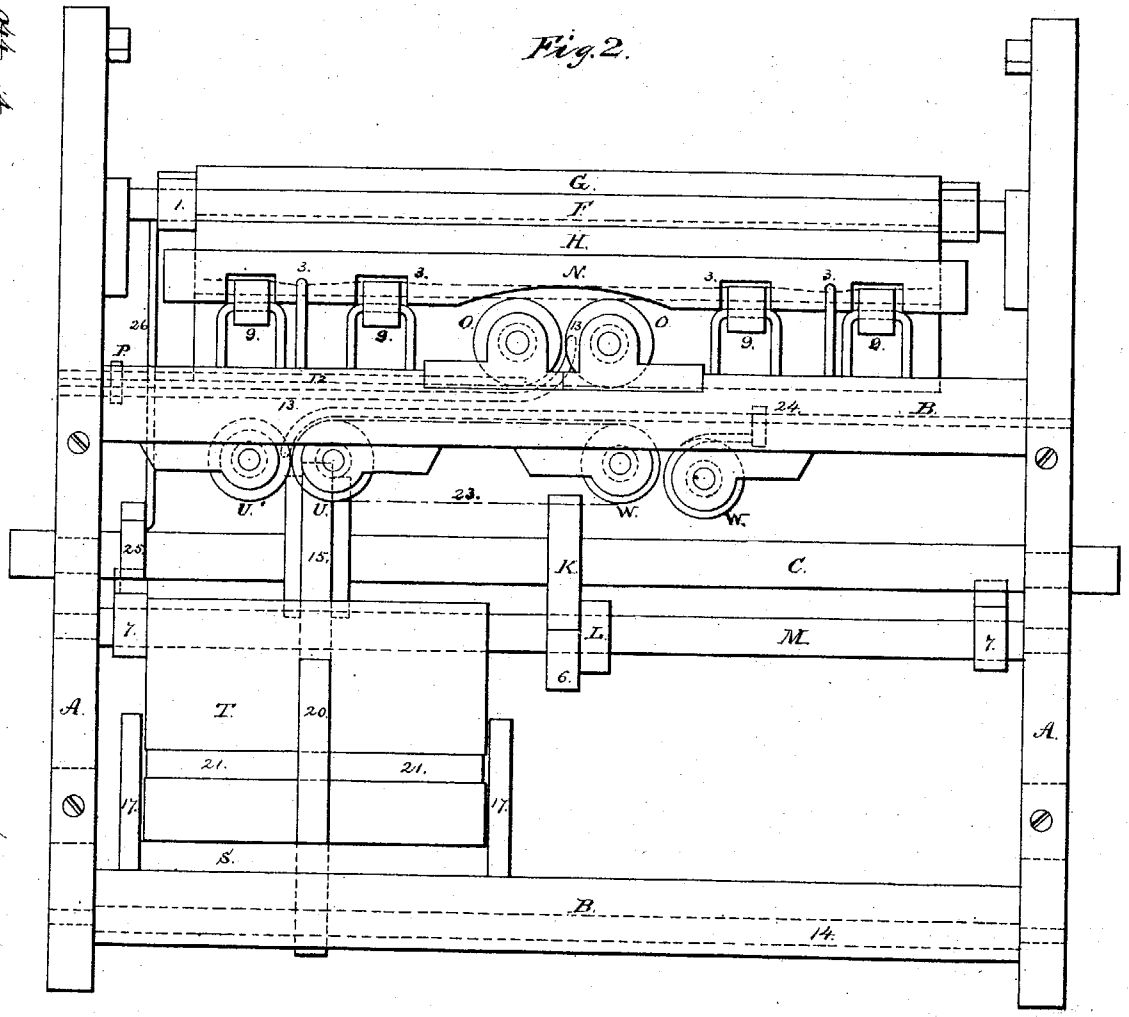

Figure 1 is a side elevation of the machine. Fig. 2 is a rear elevation. Fig. 3 is a front elevation. Fig. 4 is a ground plan. Fig. 5 shows the undulating form given to the sheet by the peculiar arrangement of the tapes and bars. Fig. 6 shows the eccentric manner of hanging the first folding-knife with respect to the centers of the folding-rollers. Fig. 7 shows the drop-roller, and the adjustable guides when they are down and in a position to carry the paper into the machine. Fig. 8 shows the same parts when they are raised and in a position to have the sheet fed to them. Fig. 9 is a transverse section of the first folding-roller with the curved bar or rod projecting beyond the surface of the same. Fig. 10 represents an arrangement for conducting the folded sheet out horizontally, without the aid of tapes, when the paper is passing downward from between the rollers. Fig. 11 shows an arrangement for turning the sheet over horizontally when the paper is passing upward between the rollers. Fig. 12 is a detached side elevation of the packing-plunger and adjacent parts. Fig. 13 is a side view, showing the shape of the cam for operating the drop-roller.

The same part is marked by the same letter or number wherever it occurs.

My invention mainly consists of the following improvements: First, starting the paper into the machine by means of a drop-roller so placed as to act directly with one of the folding-rollers, thus dispensing with the double series of tapes and the three rollers heretofore employed; second, feeding the end of the paper to vibrating guides, which are received into grooves in the folding-rollers, instead of feeding to marks, as heretofore; third, bearing off the sheet from the folding-roller by means of stationary surfaces projecting from the roller; fourth, giving a peculiar and improved movement to the first folding-knife; fifth, imparting to the sheet, on its passage from the folding-rollers, a peculiar wave or corrugated form for the purpose of more certainly and accurately arresting its movement at the proper point; sixth, turning and conducting the paper, when issuing from the rollers, without the aid of tapes; seventh, an improved arrangement of the bent bars, straight bars, and adjustable stop; eighth, an improved arrangement of the bent bars, tapes, and stop; ninth, an improvement in the packing apparatus, consisting in combining with the packing-box and its yielding slide an oscillating gate with its center of motion below the bottom of the box.

To enable others to make and use my improved folding-machine, I will proceed to describe its construction and operation, referring to the accompanying sheets of drawings.

In the drawings, A marks the sides of the main framing of the machine; B, the cross-rails, holding the side framing together; C, the main shaft, on which the cams for operating the knives and other parts of the machine are placed, and to which the driving-power is applied. It is supported in suitable bearings on the main frame, as represented. D marks the feed-table, on which the paper to be folded is placed; E, an adjustable guide on the far side of table D, to which one edge of the sheet is fed. F is a rock-shaft, working in suitable bearings across the front edge of the machine, and having two arms, 1 1, which support the bearings of the drop-roller G. To the rock-shaft F are also attached two guides, 2 2, (Figs. 1, 4, 7, and 8,) the bent ends of which extend a little beyond the point of contact between the drop-roller and the first folding-rollers, as most clearly seen in Figs. 7 and 8. H marks the first and upper folding-roller. Immediately in front of the drop-roller G, and resting on the first folding-roller H, is a carrying-roller, I, (Figs. 1, 3, and 4,) which derives its motion from the roller H by friction. It has its bearings in suitable brackets projecting from the main frame. H′ is the under folding-roller. The upper roller H has grooves in it for the reception of the gages 2 2, which pass below its surface when the drop-roller G comes in contact with it, thus allowing an unobstructed passage for the paper between rollers G and H, as clearly shown in Fig. 7. Rollers H and H′ co-operate to impart the first fold to the sheet. In addition to the grooves for guides 2 roller H is provided with grooves for the reception of curved bars 3, the curved ends of which lie beneath its surface, as shown in Fig. 9. Immediately in front of the roller H is the first folding-knife J, Figs. 1, 3, and 6, secured to eccentric bands 4, turning on stationary eccentrics 5. The eccentrics 5 serve also for the bearings of roller H, (see Fig. 3.) The knife J moves in an arc around the roller, the center of said arc being outside of the center of the roller, as shown in Fig. 6. This arrangement of the knife causes it to move with the rollers at the moment when the folding line of the paper has arrived opposite the edge of the knife, so that the folding line may be carried around with the roller H, and started between rollers H and H′, thus making the first fold without arresting the motion of the sheet, and requiring the knife to move only with the velocity of the periphery of the roller; whereas, when the knife is arranged as heretofore, its velocity must be much greater to insure accuracy of fold, and prevent the paper from bagging over the knife. The eccentric movement of the knife causes it to recede from the roller H as it rises, so as to allow ample room for the paper to pass between it and the roller, and when the knife is down causes its edge to coincide with the line of contact of the two rollers, as shown in Fig. 6 by the dotted lines. The knife J receives motion from a cam, K, on the main shaft C through the arm L, with its friction-roller 6, rock-shaft M, and its arms 7, and the connecting-rods 8. Around the roller H, and extending to and passing around the pulleys 9, are four endless tapes, 10, Figs. 1, 3, 4, and 5, which conduct the paper from the first pair of folding-rollers. The curved bars 3 are supported at one end by a cross-bar, 11, Figs. 1 and 4, so that their under surface is just above the surface of the roller H′, and at the other end by the upper cross-rail B and by bar N, so that their under surface is below the upper surface of the tapes. These bars, with their curved ends, perform three important and distinct functions: First, by their projection beyond the surface of the roller H, as shown in Fig. 9, they prevent the end of the sheet from adhering to that roller and passing in between the rollers, and cause it to float out on the air; second, they prevent the sheet from turning up and leaving the tapes during its passage from the rollers; third, by their being on a different level from that of the tapes they impart to the sheet an undulating or corrugated form, as represented in Fig. 5, during its passage from the rollers. Owing to this corrugated form it requires considerable force to cause it to bend or double up in a line at right angles to the corrugations, no matter how thin, soft, or wet the paper may be. When, therefore, the corrugated folded edge of the paper strikes against the stop N the progress of the whole sheet is immediately arrested, and it remains straight and smooth, in the line of the next fold, ready for the action of the second folding-knife. At right angles to, and in the same plane with, the roller H′, is situated the second pair of folding-rollers O O, which run in suitable boxes situated on the upper cross-rail B, and have grooves turned in them for the reception of bars 12 and 13, Figs. 1, 2, 4, and 10. These bars are so arranged as to conduct the paper horizontally from the rollers O O, the bent part of bar 13, Fig. 10, turning the paper as it descends from between the rollers. The bars thus perform the function of tapes, as described in a patent granted to me the 7th of October, 1856. Sliding on and supported by the bars 12 and 13 is an adjustable stop, P, Figs. 1, 2, and 10, whose office is to arrest the sheet at the proper point. Under the rollers O O, and at right angles to them, are the third pair of folding-rollers Q Q running in suitable boxes on the main frame of the machine. These complete the third fold, and, when desired, discharge the folded sheet into the packing apparatus, which is situated under them. The packing apparatus consists of an oscillating gate and a frictional slide co-operating in a box or trough. The oscillating gate R is about the size of a folded sheet, and works on a shaft, 14, supported by brackets from main frame A. It receives a vibratory or oscillating motion from the eccentric 16, by means of the connecting-rod 15. When up it is at right angles to the bottom S of the packing-trough, (see Fig. 12,) and when down it is in the position shown by the dotted lines R′, in Fig. 1, and ready to receive the folded sheet as it issues from between the rollers Q Q. The lower edge of the gate R moves over the curved rear edges of the bottom board of the packing-box, which have a curvature corresponding with the arc described by that edge of the gate, thus allowing the lower edge of the folded sheet to pass into the packing-box without obstruction. The packing-trough is composed of a bottom piece, S, and two side pieces, 17. The end of the bottom piece S, next the gate R, is rounded off in an arc, the center of which coincides, or nearly so, with the center of motion of the gate. Under the bottom piece S, and at the inner ends of side pieces 17, are small rock-shafts 18, turning in suitable bearings. (See Figs. 3 and 12.) Each of these shafts has one or more catches, 19, held in the position shown by spiral springs, and controlled in their backward movement by stops. They have free forward movement, so that when the gate R moves up with a folded sheet the catches yield to let it pass, and then fly back to prevent the return of the sheet. The gate having notches cut in it sufficiently large for the passage of the catches, returns to its upright position without coming in contact with them. The folded paper is held against the catches 19 by the frictional slide T, Figs. 1 and 2, which is supported in a vertical position by the bracket 20 and held in contact with the folded sheet, with any required degree of force, by the springs 21, which bear against the inner surface of side pieces 17.

This arrangement is capable of giving any amount or variation of friction that may be required, as clearly set forth in a patent granted to me April 5, 1859.

A fourth pair of folding-rollers, U U′, is supported in suitable boxes under the upper back cross-rail B and the middle cross-rail V, Figs. 1, 4, and 11, the roller U′ having grooves for the reception of the ends of the bent bars 22. These bars are so situated and shaped as to turn the paper over horizontally while passing upward from the rollers U U′, as shown in Fig. 11, the tapes 23 carrying the paper to the adjustable stops 24, Fig. 2, and presenting it ready for the action of the fifth folding-knife and the fifth pair of rollers W W. No folding-knife except the first is represented, because the arrangement and operation of the succeeding ones are substantially the same as those shown and described in my previous patents, above alluded to; unless it be in the case of the one for introducing the paper between the fourth pair of rollers U U′, and the only difference there consists in so placing the knife as to strike the paper upward instead of downward.

The operation of the machine is as follows: The paper being placed on the feed-table D, with one edge against the adjustable guide E, the sheets are scraped down until the front end of the top one comes against the adjustable gages 2, while those gages and the drop-roller G are raised to the position shown in Fig. 8, by means of cam 25, friction-roller 26, and connecting-rod 27. On the further rotation of cam 25, the drop-roller falls on the end of the sheet and clamps it against the revolving roller H. This starts the sheet under the carrying-roller I, which passes it between said roller and roller H and under the knife J. The projecting surfaces of the bent bars 3 raise the end of the sheet from the roller H and bear it off, so that the sheet hangs entirely clear when the folding line of the paper has arrived at the edge of folding-knife J. The cam K causes the knife to move around with the roller H until its edge, at the proper moment, forces the paper in between the rollers H H′, which carry the sheet through once folded. As it passes from them the tapes 10 conduct it out, and, by aid of the bars 3, impart to it the corrugated form before described, and shown in Fig. 5. When the folded edge strikes against the stop N the farther progress of the whole sheet is at once arrested, when it is struck by the second knife and forced between the second pair of rollers O O, which give it a second fold and deliver it to the bars 12 and 13, the bent part of the bar 13 turning the sheet, and the two bars conducting it out, as before described. The momentum of the sheet is sufficient to condut it to the stop P after it has left the rollers. The sheet now receives its third fold by being forced between the third pair of rollers Q Q, from which, when desired, it may be delivered to the packer, falling on the gate R when in the position represented by the dotted lines in Fig. 1. This is effected by leaving off the tapes that conduct the sheet to the fourth pair of rollers. When discharged from the third pair of rollers the sheet slides down on the gate R until it strikes the bottom piece S, when the gate moves up and pushes the sheet past the yielding catches, which, when the sheet has passed them, return to their former position and prevent the sheet from returning with the gate. The frictional plunger T is forced back by the pressure to make room for each additional sheet that falls from the rollers. When five folds are required the tapes from the rollers Q Q are put on, and the sheet conducted to the fourth pair of rollers U U′, when it is forced upward between them. The bar 22 turns the sheet over horizontally as it leaves rollers U U′, and, by the aid of tapes or otherwise, conducts it to rollers W W, which give it the fifth fold, when it drops into a box suitably arranged below to receive it.

I am acquainted with the patent of J. F. Weeks, dated June 9, 1857; and do not claim the combination of drop-roller and tape-rollers described in that patent, the object of the first part of my present invention being, as hereinbefore stated, to dispense with the rollers and tapes employed by him in feeding the sheet to the machine, and to feed the sheet directly from the table to the folding-rollers, thus greatly simplifying the feeding mechanism.

Having thus fully described my invention, what I claim, and desire to secure by Letters Patent, is—

1. A drop-roller, co-operating by direct contact with one of the folding-rollers in feeding in the sheet, as specified.

2. The grooved folding-roller H, in combination with the vibrating guides 2 2 attached to the rock-shaft F, for the purpose of registering by a positively-acting mechanism the forward edge of the sheet as it enters the machine, as specified.

3. The curved bars 3, arranged to project beyond the surface of the folding-roller, for the purpose of raising or bearing off the sheet from the folding-roller, as set forth and shown.

4. The folding-blade J hung on eccentrics and moving in an arc around one of the folding-rollers, as and for the purpose specified.

5. The combination of the tapes, rods, and stop, arranged in the manner described, for the purpose of corrugating the sheet and presenting it properly to the action of the folding-blade, as set forth.

6. The bent bars 13 and 22, in combination with the folding-rollers grooved to receive their curved ends, for the purpose of turning or conducting the paper, in the manner stated.

7. The combination of the bent bars with the straight bars and adjustable stop, arranged substantially in the manner described.

8. The combination of the bent bars with the tapes and stop for the purpose specified.

9. The combination of the oscillating gate with the packing-box, provided with a yielding slide, and having the rear edge of its bottom board rounded, in the manner and for the purpose set forth.

The foregoing specification of my invention signed and witnessed at Philadelphia this 28th day of June, A. D. 1873.

CYRUS CHAMBERS, JR.

Witnesses:
THORWALD CHR. DAMBORG,
MARIS CHAMBERS.